Jan. 4, 1927.　　　F. COX　　　1,613,086
TRAILER COUPLER AND BRAKE ACTUATOR
Filed Jan. 28, 1926
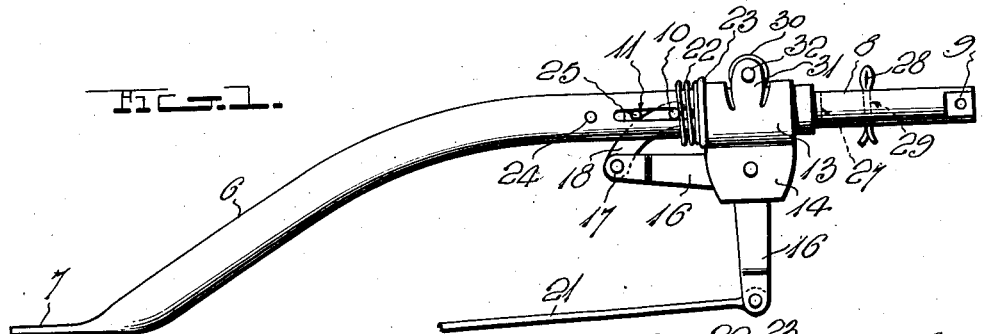
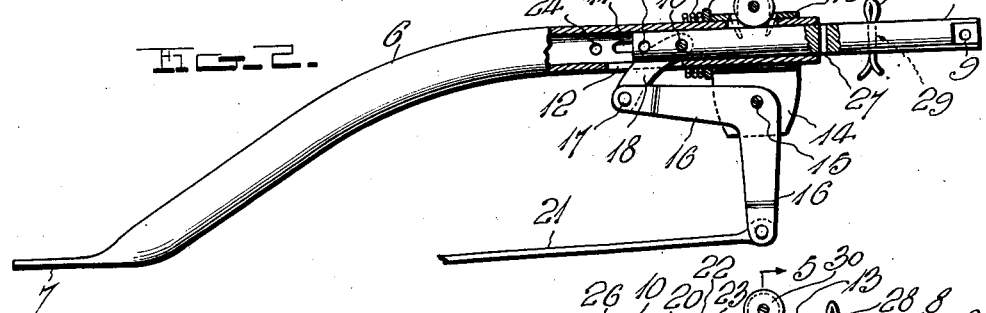
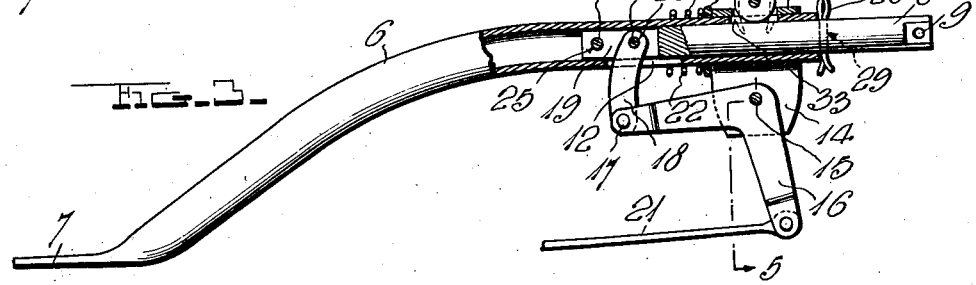
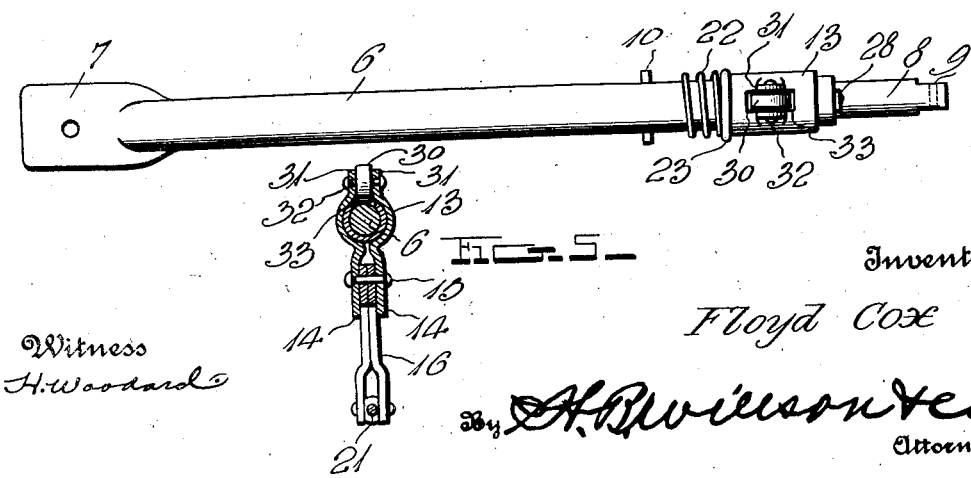
Inventor
Floyd Cox
Witness
H. Woodard
By H. B. Willson & Co.
Attorneys Patented Jan. 4 1927.

1,613,086

UNITED STATES PATENT OFFICE.

FLOYD COX, OF SHERIDAN, WYOMING.

TRAILER COUPLER AND BRAKE ACTUATOR.

Application filed January 28, 1926. Serial No. 84,428.

It is the aim of this invention to provide an exceptionally simple and inexpensive, yet an efficient and desirable coupler for connecting a trailer with a leading vehicle and embodying means for automatically applying breaks to said trailer, whenever it has a tendency to run forward upon the leading vehicle, for instance, when descending steep grades.

A further aim is to provide novel means whereby when the coupler is left upon the trailer, its brake-applying means may be locked in effective position, so that the trailer cannot drift.

A further aim is to make unique provision for preventing actuation of the brake-applying means when desired, for instance, when the leading vehicle and the trailer are to be backed.

With the foregoing in view, the invention resides in the novel subject matter hereinafter described and claimed, the description being supplemented by the accompanying drawing.

Figure 1 is a side elevation showing the brake actuating means in normal running position.

Figure 2 is a sectional view with the brake actuating means in the position of Fig. 1.

Figure 3 is a view similar to Fig. 2 but illustrating the brake actuating means in effective position and locked in such position.

Figure 4 is a top plan view.

Figure 5 is a transverse sectional view on line 5—5 of Fig. 3.

The preferred details of construction are shown in the drawings above briefly described and will be hereinafter specifically described, with the understanding however that within the scope of the invention as claimed, numerous variations may be made.

The numeral 6 designates a rigid tube having one end 7 constructed in any desired manner for connection to a trailer, while disposed at the other end of said tube is a plunger 8 partly within the tube and partly projecting from the latter, the outer end of this plunger being provided with suitable means such as an opening 9 to facilitate connection with the leading vehicle. A transverse pin 10 passes through the inner end portion of the plunger 8 and has its ends slidably received in slots 11 in opposite sides of the tube 6, said tube being formed with an additional longitudinal slot 12 in its lower side for a purpose to appear.

A single metal plate is bent to form a sleeve 13 and a pair of parallel lugs 14 projecting from said sleeve, the latter being welded or otherwise secured around the plunger-receiving portion of the tube 6, with the lugs 14 projecting downwardly from the latter, said lugs extending in planes longitudinally disposed with respect to the aforesaid tube. Positioned between these lugs 14 and at 15, fulcrumed to said lugs for movement in a plane parallel with the aforesaid planes, is a brake-actuator which is preferably in the form of a bell crank 16. One arm of this bell crank extends inwardly from the lugs 14, under the tube 6 and is pivoted at 17 to the lower end of the link 18. This link passes through the slot 12 and enters a slot 19 in the plunger 8, and is pivoted to the latter at 20. The other arm of the actuator 16 extends downwardly and may be connected by a rod or other desired means 21, with brake mechanism of the trailer. Normally, when the leading vehicle and the trailer are running, the brake actuator 16 is disposed as shown in Figs. 1 and 2, the link 18 being then at an obtuse angle to the plunger 8. When the speed of the leading vehicle however is checked or for some other reason, the trailer has a tendency to run forwardly toward said leading vehicle, the plunger 8 slides inwardly, thereby causing the link 18 to rock the actuator 16 to the position of Fig. 3. Thus, the actuator 16 pulls upon the connection 21 and applies the trailer brakes. When the plunger 8 is again pulled outwardly, the brakes are released, and in order to cushion this outward movement, a coiled compression spring 22 is disposed in the outward path of the projecting ends of the pin 10. This spring preferably abuts a collar or the like 23 which may well engage the inner end of the sleeve 13.

If the leading vehicle is to be uncoupled from the trailer, and it is desired that the brakes of the latter shall remain set, this end may readily be attained, by passing a pin which is shown in section in Fig. 3, through openings 24 in the tube 6 and through an opening 25 in the plunger 8, said pin being designated at 26.

It is often desirable that the plunger 8 shall be held against inward movement, for instance when the trailer and the leading machine are to be backed. To permit such holding, the plunger is formed with an opening 27 at the outer end of the tube 6, through which to pass an appropriate pin to abut said tube. The pin 28 shown in the drawings, may well be used for this purpose, and normally, said pin may extend through an additional opening 29 of the plunger 8 spaced outwardly from the opening 27 so that it may be utilized to limit the inward movement of the plunger.

Preferably used in conjunction with the details of construction above described, is an antifriction roller 30, permitting easy sliding of the plunger 8. To mount this roller, I prefer to stamp a pair of lugs 31 upwardly from the sleeve 13, the roller being mounted between these lugs on a rivet or the like 32, and having its peripheral portion receivable in a slot 33 in the tube 6.

By constructing the device in the manner shown and described or in an analogous way, not only will it be simple and inexpensive, but it will possess the advantages of being efficient, durable and generally desirable.

I claim:—

1. A trailer coupler and brake actuator comprising a tube having means at one end for connecting it to a vehicle, a plunger partly in and partly projecting from the other end of said tube and having means for connection to another vehicle, said tube having a longitudinal slot, a lug projecting from the last named end of said tube, a brake actuator comprising a bell-crank lever pivoted to said lug, one arm of said bell-crank lever extending longitudinally of said tube, a link pivotally connected at one end to said plunger and at its other end to said longitudinally extending arm of the bell-crank lever, and a rod connected to the other arm of said bell-crank lever, whereby the latter is connected to the brake mechanism of the trailer.

2. A trailer coupler and brake actuator comprising a tube having means at one end for connecting it to a vehicle, a plunger partly in and partly projecting from the other end of said tube and having means for connection to another vehicle, said tube having a longitudinal slot, a metal plate bent to provide a sleeve and a pair of parallel lugs projecting therefrom, said sleeve being secured around the plunger-receiving portion of the tube with said lugs projecting from the slotted side of said tube in planes extending longitudinally of the latter, a brake actuator between and pivoted to said lugs for movement parallel with the above-named planes, and a link pivoted to said actuator and said plunger, said link passing through the slot of said tube.

3. A trailer coupler and brake actuator comprising front and rear movably connected sections for connection to leading and trailing vehicles respectively, brake applying means operatively connected with said sections and means directly connected with said brake applying means for positively holding the latter in effective position when the trailer is disconnected from the leading vehicle.

4. A trailer coupler and brake actuator comprising a tube having means at one end for connecting it to a vehicle and having in its opposite sides aligned pin holes and in its lower side a longitudinal slot, a plunger slidably mounted in and projecting from the forward end of said tube and having in said projecting end means for connection to a leading vehicle, said plunger having near its inner end a transverse pin hole adapted to align with the pin holes in said tube when the plunger is in a retracted position for applying the brake, a brake actuator pivotally connected to said tube and having an operative connection with the inner end of said plunger through the slot in the lower side of the tube, and a pin adapted to be inserted through the aligned pin holes in the plunger and tube to lock the plunger and brake actuator in effective position when the trailer is disconnected from the leading vehicle.

5. A trailer coupler and brake actuator comprising a tube having means at one end for connecting it to a trailer and having in its opposite sides aligned longitudinal slots and in its lower side another longitudinal slot, a plunger slidably mounted in and projecting from the forward end of said tube and having in said projecting end means for connection with another vehicle, a brake actuator comprising a bell-crank lever pivotally mounted on said tube, a link extending through the slot in the lower side of the tube and having one end pivotally connected with one arm of said bell-crank lever, a pivot pin pivotally connecting the opposite end of said link to the inner end of the plunger, the ends of said pin projecting through the longitudinal slots in the sides of the sleeve, a collar fixed on said sleeve, a cushioning spring arranged on the sleeve between said collar and the projecting ends of said pin and means for connecting the other arm of said bell-crank lever with the brake mechanism of the trailer.

6. A trailer coupler and brake actuator comprising a tube having means at one end for connecting it to a vehicle, a plunger partly in and partly projecting from the other end of said tube and having means for connection to another vehicle and having a plurality of openings at the outer end of said tube through which to pass a pin to limit the inward movement of the plunger or to hold the same against inward movement, said tube having a longitudinal slot, a lug projecting from the last named end of said tube, a brake actuator pivoted to said lug for movement in a plane extending longitudinally of the tube, and a link pivoted to said actuator and said plunger, said link passing through the slot of said tube.

In testimony whereof I have hereunto affixed my signature.

FLOYD COX.